INVENTOR
ADRYL WADE GARDNER

BY Alexander & Dowell
ATTORNEYS

Dec. 15, 1964 A. W. GARDNER 3,161,250
MULTIPLE-WHEEL ARTICULATED DRIVE AXLE AND VEHICLE
Filed June 15, 1961 4 Sheets-Sheet 2

INVENTOR
ADRYL WADE GARDNER
BY Alexander & Dowell
ATTORNEYS

INVENTOR
ADRYL WADE GARDNER
BY Alexander & Dowell
ATTORNEYS

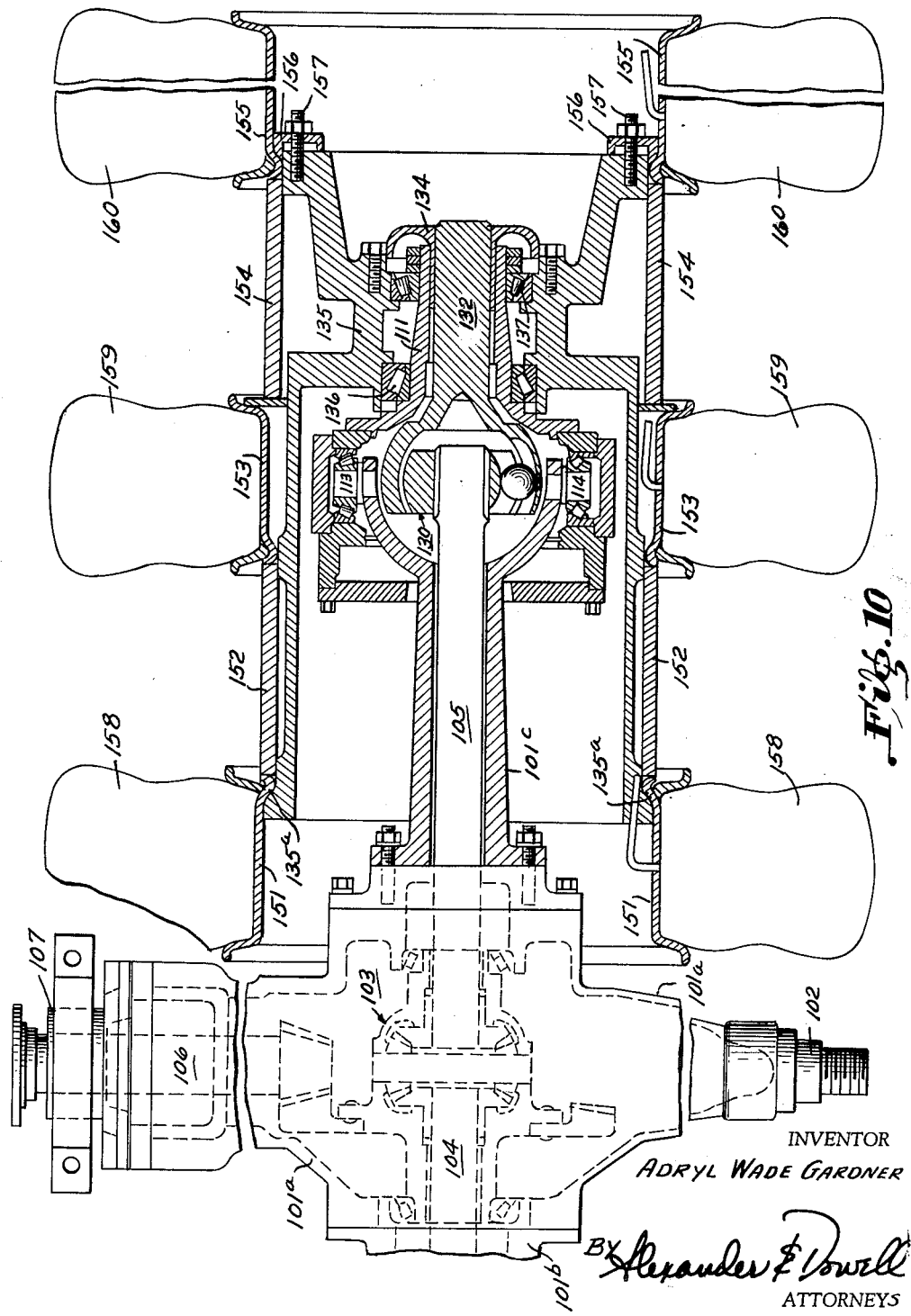

United States Patent Office 3,161,250
Patented Dec. 15, 1964

3,161,250
MULTIPLE-WHEEL ARTICULATED DRIVE
AXLE AND VEHICLE
Adryl W. Gardner, 19 N. Buena Vista Ave.,
Redlands, Calif.
Filed June 15, 1961, Ser. No. 117,470
10 Claims. (Cl. 180—22)

This invention relates to novel multiple-wheel drive-axle assemblies and to novel combinations thereof with vehicle frames and with chassis having other wheel-supporting axles, the novel teachings of this invention being especially directed toward improvement of the drive-traction characteristics of heavy-duty off-highway machines.

It is a principal object of this invention to provide improved means for mounting and positively driving the drive wheels of a vehicle having at least two drive wheels on each side of the center of its drive axle, the novel mounting means permitting each pair of drive wheels to adjust their tilts and their vertical positions relative to each other and to the vehicle chassis in such a manner as to maintain substantially uniform weight distribution among all of the drive wheels, so that ground-traction is uniformly maintained by all of the drive wheels despite changes in ground contours. Where dual drive wheels are used on each side of center of the drive axle, the present teaching discloses structure whereby the weight remains precisely equally distributed among all four drive wheels so that slippage of one or more wheels and accompanying loss of vehicle drive-traction never occurs due to partial or complete unloading of these drive wheels when passing over soft spots or over irregular surfaces.

More specifically, it is the object of this invention to provide a vehicle drive means including a transverse drive axle having at its center longitudinally disposed trunnion means for mounting the axle to the vehicle along a substantially horizontal central axis about which the axle may oscillate so as to adjust its tilt to the general contour of the ground, the axle having a horizontally articulated knuckle joint at each end coupling to the axle, spindle means on which the wheels are journaled in symmetrical relation with respect to the axis of articulation of the associated knuckle joint. The axle also includes differential drive means to be coupled to and driven by a prime mover on the vehicle, and in turn driving both multiple-wheel assemblies at the ends of the axle through universal joints housed in the knuckles.

It is another major object of the invention to provide the combination of a self-propelled vehicle with the above-described drive axle and dual-wheel assembly, in which combination the transverse attitude of the vehicle chassis with respect to the ground contour is determined by transversely separated non-driven wheels carried on other axle means attached to the vehicle body and longitudinally spaced from said drive-axle assembly, this combination providing a smoother riding vehicle in which, for example in the case of a two-axle vehicle, the chassis is transversely tilted only once by each change in contour of the ground as the non-driven wheels pass thereover because of the fact that the drive axle follows such contours with a free-floating motion and therefore without tilting the vehicle chassis. In the two-axle vehicle mentioned in this example, said other axle means includes the steering wheels; and the chassis of the vehicle follows the transverse tilt of the ground contour as traversed by the steering wheels but fails to repeat such tilting motion when the same contour is traversed by the wheels on the free-floating drive axle assembly.

A portion of the following discussion of the figures of the drawings describes the use of the present drive axle and dual-wheel assembly in a two-axle nine-wheel pneumatic roller, which serves as an excellent example of an organization in which the present invention may be included to advantage. Machines of this general type are well known in the prior art and, in fact, are specified for use in most of the State Highway Department Contracts.

In order to build better highways it is necessary to increase the compaction effort on filled earth and aggregate lifts being rolled, and therefore the trend is toward heavier wheel loads than the present 2000 lb./wheel loads to which the above-mentioned prior-art machines are ballasted. However, heavier wheel loads are accompanied by a greater tendency of the machine to bog down in relatively thick lifts. The maximum wheel loading is usually limited by the amount of traction of the drive wheels on the material being rolled. If the filled lift is substantially uniform in density and distribution and if the ground is level, an optimum wheel load can easily be determined and maintained, but, on the other hand, if the ground is irregular or the lift is non-uniform so that there are soft spots here and there, the present machines when even moderately loaded are defeated by loss of wheel traction as soon as one or more of the wheels becomes partially or fully unloaded.

In other words, optimum wheel traction depends on equal distribution of weight among all of the drive wheels, and when one wheel becomes unloaded because it can not follow down into a soft spot, the wheels on that end of the axle spin and the machine is through propelling itself unless ballast is reduced thereon. As stated above, the prior-art machines, having non-floating drive wheels which can only pivot about joints which themselves can not oscillate about a central axle-mounting trunnion, are normally ballasted to about 2000 lbs./wheel, but these machines can not be operated when so loaded on any lift that is not relatively shallow and regular on its surface and supported on a sub-base which is well compacted already.

It is another principal object of this invention to provide a self-propelled machine of the type described, the utility of which is extended from the present rolling of relatively well consolidated surfaces to the rolling of softer and thicker lifts, while at the same time increasing the permissible loading per wheel in order to obtain greater compaction. In a series of actual tests employing similar nine-wheel pneumatic-tire machines of the same weight and other specifications, the above-mentioned prior-art machines had to be unloaded to 1000 lb./wheel in order to maintain enough traction so that they could propel themselves through a seven-inch lift of uncompacted soil, whereas a machine including the present novel drive axle assembly propelled itself through the same lift with 4000 lb./wheel loading without loss of traction. The results of this test clearly bring out the magnitude of the improvement obtained by the use of the present teaching.

It is another important object of the present invention to provide a machine having a lower center of gravity and having a substantially enclosed and protected drive train to the wheels from the engine. In many of the prior art pneumatic-tired earth working machines the drive axle and differential are located high-up, in some cases the drive axle being located entirely above the wheels and driving the latter through chains disposed in vertical planes. It is the object of this invention to place the differential and drive axle assemblies at the level of the wheel hubs and to lower the engine accordingly to obtain at the same time a lower center of gravity and a flexibility of wheel motion not taught in the prior art.

It is a further important object of this invention to provide a drive axle pivotally supported at its center on the vehicle chassis by trunnion means oriented longitudinally of the chassis along a substantially horizontal axis, the trunnion means preferably housing in coaxial relationship the main drive shaft from a drop-box containing a gear train which is coupled at its upper end to the engine and clutch assembly, this arrangement permitting oscillation of the axle about said horizontal axis without interference with the drive to the axle, and also permitting substantially the entire power train from the engine to the drive wheels to be enclosed, thereby retaining lubricants while excluding dirt.

It is another important object of this invention to provide a unitized power chassis including an engine and drive train, and including a drive axle and drive wheels which unitized power chassis can be secured to any one of a wide variety of sub-chassis having other ground-engaging running gear means which may comprise wheels or rollers or even sleigh runners, and said sub-chassis perhaps including other soil and roadway working tools, the present invention, however, not being limited to machines of this character but also including transportation vehicles especially adapted for off-highway use over rough or swampy terrain.

Other objects and advantages of the invention will become apparent during the following discussion of the drawings, wherein.

Figure 4:
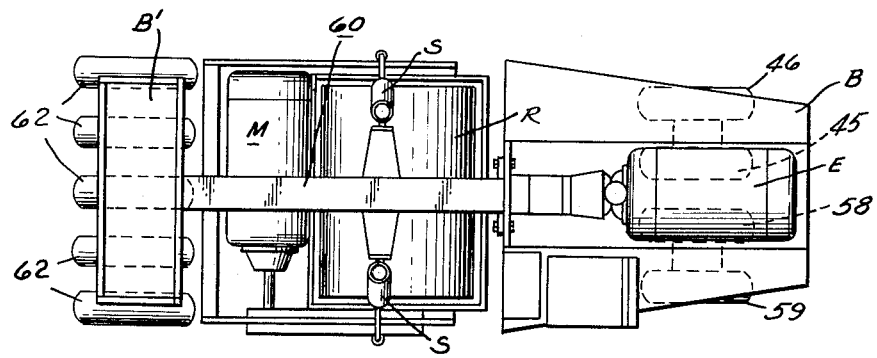
FIG. 4 is a plan view of a machine according to FIG. 3.
Figure 3:
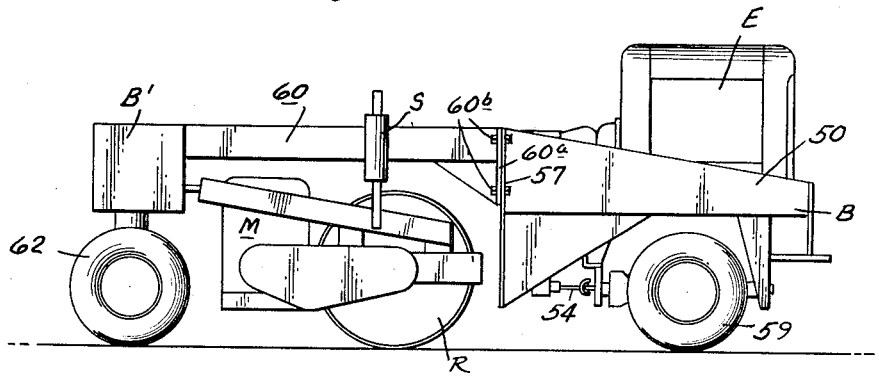
FIG. 3 shows a side view of a power chassis of the type illustrated in FIG. 2 coupled with a sub-chassis having steering wheels and a vibrator-roller assembly, the entire structure comprising a road working vehicle.

FIGS. 5, 6, 7, 8 and 9 are rear views of a machine of the type shown in FIGS. 3 and 4, but illustrating only the rear drive axle and wheels and the rear end of the chassis to show various positions which can be assumed by the rear drive wheels in order to follow the contour of the ground, each of these views assuming that the front wheels of the vehicle are on level ground and are maintaining the chassis of the vehicle substantially level; and FIG. 10 is a plan view partly in cross-section of the central and right-hand portions of a drive axle including an articulated triple-wheel assembly.

Figure 1:
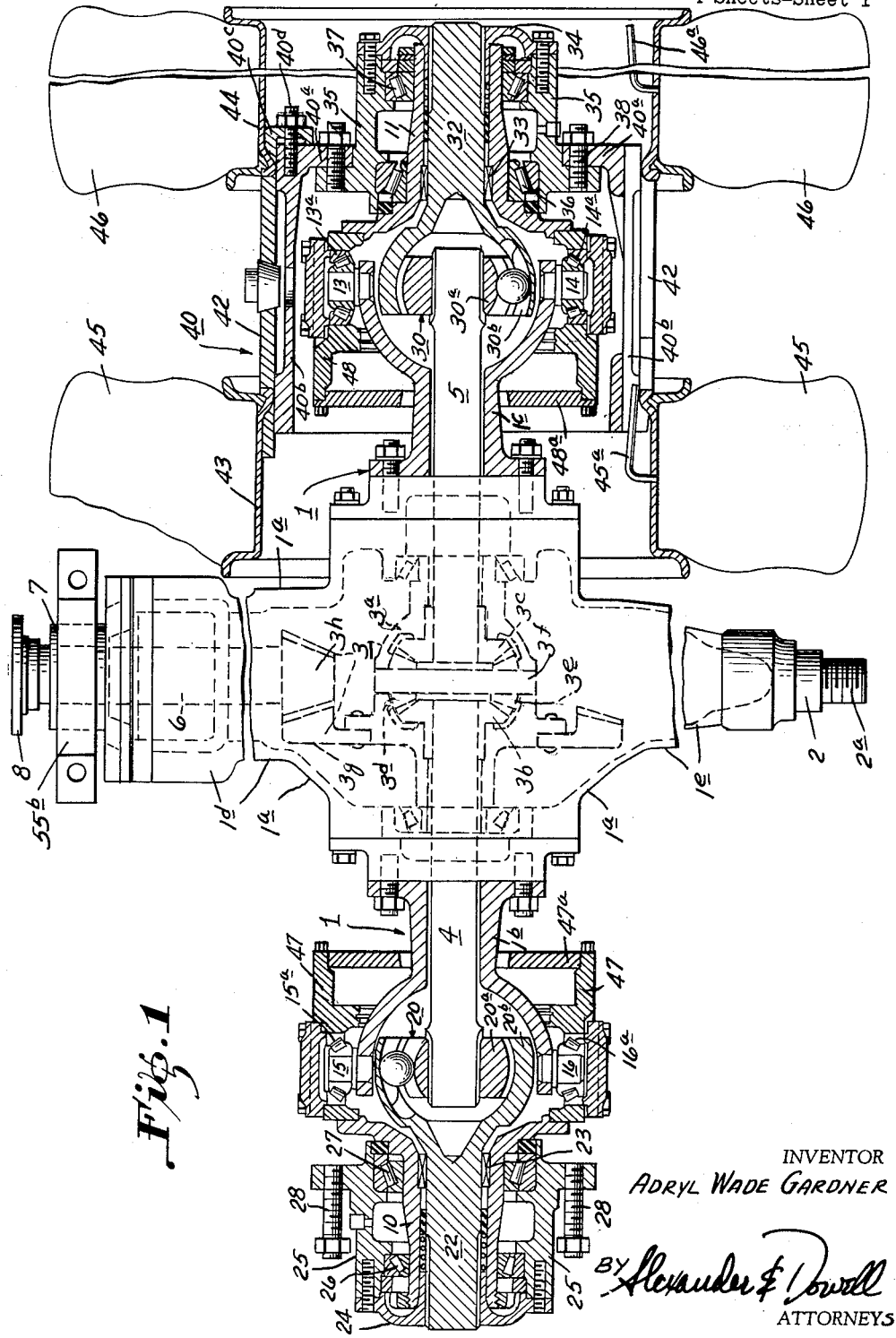
FIG. 1 is a plan view partly in section of a drive axle having horizontally articulated knuckle joints at both ends and having trunnion means at its center, a dual-wheel assembly being shown mounted on the right end of the axle.

Referring now to the drawings, the embodiment of FIG. 1 shows an axle housing generally referred to by the reference numeral 1 and comprising a differential housing 1a connected by suitable bolt means to opposite extending shaft housing 1b and 1c. The differential housing has two portions which extend at right angles to the axes of the shaft housings and includes a forward extension 1d and a rearward extension 1e, the latter terminating in a trunnion 2 having a threaded shaft extension 2a for the purpose hereinafter discussed. Within the differential housing 1a is a conventional differential assembly 3 including a carrier 3a, two differential side gears 3b and 3c coupled respectively to drive shafts 4 and 5, and two differential pinions 3d and 3e supported on a pinion carrier 3f. Mounted and carried by differential assembly 3 is a differential drive bevel gear 3g mating with bevel gear 3h which is driven by power shaft 6 which passes outwardly through the forward trunnion 7 to a suitable coupling 8, the shaft 6 being journaled within the trunnion 7 and passing therethrough into the differential housing 1a. The outer ends of the shaft housings 1b and 1c, when taken with the inner ends of spindles 10 and 11 comprise the knuckle joints which are articulated about king pins 13, 14, 15 and 16 respectively, each pair of king pins being aligned along a horizontal axis which lies parallel with the axis of the shaft 6 and the trunnions 2 and 7. The inner ends of the spindles 10 and 11 support the outer races of the bearings 13a, 14a, 15a and 16a, and the inner races of these bearings are supported on king pins 13, 14, 15 and 16. It is therefore apparent that the spindles are able to rotate on these bearings about the axes of the king pins so that the spindles may tilt with respect to the axes of the shafts 4 and 5. Inside of the left knuckle joint there is a spherical universal joint 20 having an inner member 20a splined on the end of the shaft 4 and having an outer member 20b which forms a part of a stub shaft 22 which is journaled within the spindle 10 on bearings 23, and which is connected by means of splines on the outer end of the stub shaft 22 with a cup 24, said cup extending around the end of the spindle 10 and being bolted to a wheel hub 25, this wheel hub being itself supported on the spindle 10 by roller bearings 26 and 27. The hub has a plurality of studs 28 adapted to receive and secure a multiple-wheel assembly in the manner to be presently explained.

Likewise, at the other end of the axle assembly there is a universal joint 30 which is also of the spherical ball type, which incidentally provides constant velocity motion, the universal joint 30 having an inner member 30a splined to the end of the shaft 5 and having an outer member 30b which forms a part of a stub shaft 32. The stub shaft is journaled on bearings 33 to the inner surface of the hollow spindle 11 and the end of the stub shaft 32 is connected with a cup 34 which is in turn bolted to a hub 35 journaled on roller bearings 36 and 37, and the hub 35 carrying studs 38 which pass through holes in the flanges 40a of a dual-wheel assembly 40 so as to secure this flange 40a to the hub 11 for rotation therewith.

The flange 40a is a part of a cylindrical wheel 40b on which are mounted the tire rims 43 and 44 of the dual tires 45 and 46. The tire rims 43 and 44 are mutually spaced by a cylindrical spacer 42, all of which parts are held on the wheel 40b by reaining lugs 40c secured by studs 40d. Suitable stems 45a and 46a are provided for inflation of the tires. Also, the above structure includes a plurality of all seals, shims and other devices customarily used in the assembly of axle beams of this general type. The tires and the wheel rims are so located along the length of the axles that the tires are symmetrically spaced on opposite sides of the king pin axes of the knuckle joints. For instance the axis of the pins 13 and 14 passes precisely midway between the tires 45 and 46. By this means, the weight is divided exactly between the wheels, and no moment of rotation about the axis is created except by irregularities in the surface being traversed by the dual tires.

As these dual-wheel assemblies pivot about the horizontal axes of the knckle joints, the angles through which they can pivot are limited by arcuate stops 47a and 48a which are supported on housings 47 and 48 respectively comprising parts of the spindles 10 and 11 and pivot therewith. When the dual-wheel assemblies articulate, the arcuate stops 47a and 48a strike upon the shaft housings 1b and 1c after the knuckle joints have pivoted to the maximum permissible degree and prevent further pivoting thereof which, if not limited, might otherwise cause the wheels to strike against the differential housing 1a.

Figure 2:
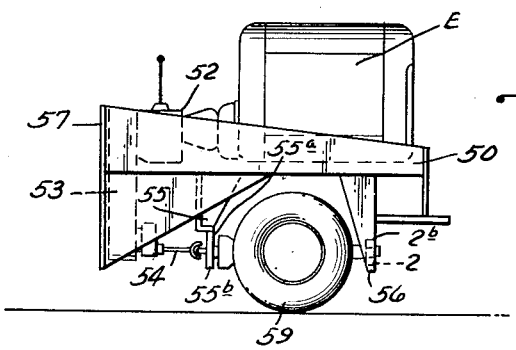
FIG. 2 shows a side view of a unitized power chassis including a drive axle and wheel assembly of the type shown in FIG. 1, and showing the drive axle coupled through suitable power-train means to an engine located above on the chassis.

Referring now to FIG. 2, this figure shows a unitized power chassis including an engine E supported on a frame 50 and driving a change speed gear box 52 through an appropriate clutch. The frame 50 also supports a drop-box 53 having a train of gears therein (not shown), which train is driven at its upper end by the transmission 52 and at its lower end drives a propulsion shaft 54 connected by appropriate universal means to the flange coupling 8, FIG. 1, at the front end of the transmission trunnion 7. The front trunnion 7 of the transmission is supported by a bracket 55 having an appropriate bearing retaining means including an upper portion 55a and a lower portion 55b which can also be seen in FIG. 1. The rear trunnion 2 of the drive axle is supported in an appropriate bearing 2b which in turn is supported in another bracket 56 which forms a part of the frame 50 of the machine. At the front end of the frame is a plate 57, FIG. 2, which can be suitably drilled to receive bolts 60b which also pass through a complementary drilled mounting bracket 60a located at the rear end of a sub-chassis 60. This sub-chassis carries steerable wheels 62 generally referred to merely to show a set of wheels which are capable of establishing the tilt of the chassis of the machine in order to hold the entire chassis at the angle of the ground contour presently supporting the front wheels 62. The sub-chassis illustrated in FIGS. 3 and 4 can be equipped with any suitable utility tool, such as a scraper, or as illustrated in these figures, a vibrating roller assembly of well-known type, which assembly includes a motor M eccentrically driving a bushing (not shown) journaling a roller R. A floating tool-suspension is provided to maintain the assembly in position under the machine's frame and lift cylinders S serve to adjust the weight on the roller. This suspension means may alternatively be of a rigid or a positionable type depending on the type of tool assembly carried by the machine; i.e. scraper, vibrating roller, pan-type vibrator, soil stabilizer, etc. In other words, some tools have to be rigidly positioned in place, while others can be permitted to "float" and thereby find their own elevation and position.

Of course, other types of front ends can be connected to the power chassis 50, it only being necessary that the front wheels 62 be capable of supporting the composite vehicle chassis in substantially level position in view of the fact that the drive wheels 59, 58, 46 and 45 do not provide any support for the chassis against tilting since they are mounted on an axle which itself is intended to tilt around the trunnions 2 and 7 with respect to the chassis. Appropriate ballast tanks B and B' are illustrated for the sake of completeness.

Figure 5:
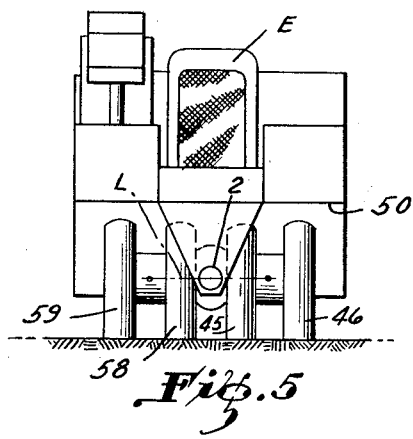

The rear views of the machine shown in FIGS. 5, 6, 7, 8 and 9 serve as comparative illustrations of various possible positions that can be assumed by the rear axle 1 and by the dual-wheel assemblies supported on the knuckle joints thereon. For instance, in all of these figures the vehicle chassis 50 is level, meaning that the front wheels (not shown) are standing on level ground, but the drive wheels may assume any one of a plurality of different positions, some of which are illustrated. In FIG. 5, the rear wheels 59, 58, 45 and 46 are also standing on level ground.

Figure 6:
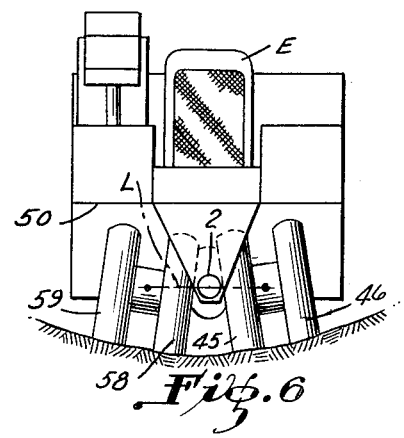
Figure 7:
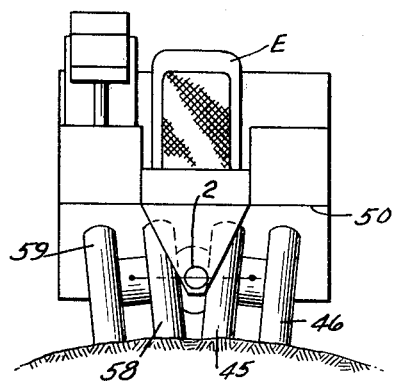
Figure 8:
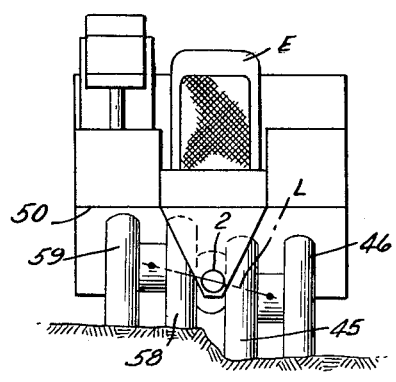

In FIG. 6, the rear wheels are on concave ground so that the left set of dual wheels 58, 59 are tilted in one direction whereas the right set of wheels 45, 46 are tilted in the opposite direction. FIG. 7 shows the opposite condition in which the drive wheels are on convex ground so that the respective dual wheels are tilted oppositely from those shown in FIG. 6.

Figure 9:
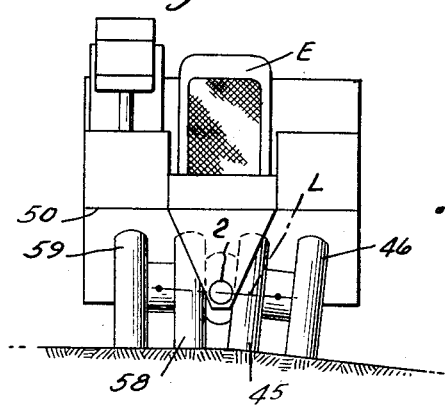

Note that in FIGS. 5, 6 and 7 the transverse axis of the drive axle is horizontal and is parallel to the bottom of the chassis 50 because of the fact that the ground on which the machine is standing is symmetrical on both sides of a vertical line drawn through the trunnion 2. In each of these five views a line L is drawn through the trunnion 2 and terminates in a small circle at each end, which circle illustrates the axis of each of the knuckle joints around which the dual-wheel assemblies can tilt. In FIGS. 5, 6 and 7 this line is horizontal, whereas in FIG. 8 the line tilts sharply to the right indicating that the axial housing has tipped and that the dual wheels have then rotated around the knuckle joints so as to keep their axes horizontal, but on different elevational levels. In FIG. 9 the line L indicating the position of the axial housing is tilted only slightly to the right because of the fact that the right pair of dual wheels 45, 46 have tilted somewhat to the right whereas the wheels 58, 59 have remained level. The examples shown in these drawings by no means define all of the possible positions which the drive-axle and the drive-wheel assemblies can assume, but are merely intended to show various positions which will illustrate the performance of the present suspension arrangement.

FIG. 10 is a modification employing an odd number of drive wheels on each side of the drive-axle assembly, namely triple wheels on each side thereof. It is important to note that the three tires are located symmetrically with respect to the axis of articulation of the associated knuckle joint. In FIG. 10 parts which are analogous to corresponding parts in FIG. 1 are provided with similar reference characters, but with 100 added to the reference number. This figure thus illustrates a differential housing 101a having a rear trunnion bearing 102 at one end and a forward trunnion bearing 107 at the other end. A differential assembly 103 transmits drive from the shaft 106 to the respective drive shafts 104 and 105. These shafts are respectively journaled within housings 101b and 101c, which latter housing, as shown, terminates in a knuckle joint articulated about king pins 113 and 114, which joint joins the housing 101c to the spindle 111. This spindle houses a stub shaft 132 which is driven by the shaft 105 through a universal joint 130, the stub shaft being splined at its outer end to a cup 134 which is in turn bolted to a hub 135 journaled on roller bearings 136 and 137. The hub 135 includes cylindrical wheel portions which support three tire rims 151, 153 and 155 which are mutually spaced apart by spacers 152 and 154. Lugs 156 and studs 157 cooperate to hold the wheel rims and spacers jammed tightly against the shoulder 135a. The rims support tires 158, 159 and 160 equally spaced apart and symmetrically located with respect to the axis of the king pins 113 and 114.

The present invention is not to be limited to the exact embodiments illustrated in the drawings, but is intended to have general applicability to a variety of structures within the limitations of the following claims.

I claim:

1. In combination with a vehicle chassis, an axle and multiple-wheel assembly comprising an axle disposed transversely of said chassis; axle-mounting means on said chassis and on said axle and pivotally supporting the former for oscillation with respect to the former about a substantially horizontal axis longitudinally disposed at the transverse center of the chassis, said axis passing through the center of gravity of said axle and wheel assembly; spindle means at each end of the axle; a pivoted joint connecting each spindle means to an end of the axle about a horizontal axis of articulation disposed longitudinally of the chassis and in the same plane as said first-mentioned horizontal axis; and multiple wheels journaled on each spindle means with at least two of said wheels on each spindle means disposed on opposite sides of the axis of articulation of the adjacent pivotal joint.

2. In combination with a vehicle chassis having transversely spaced ground-engaging running gear means and having a prime mover directly mounted on said chassis, a drive axle and multiple drive-wheel assembly, comprising axle means disposed substantially along a transverse axis and spaced longitudinally of the chassis from said running gear means; axle-mounting means on said chassis and on said axle means and pivotally supporting the latter for oscillation with respect to the former about a substantially horizontal axis disposed longitudinally at the transverse center of the chassis; spindle means at each end of the axle means; a knuckle joint joining each spindle means to the axle means for articulation about a horizontal axis disposed longitudinally of the chassis and in the same plane as said first-mentioned horizontal axis; hub means journaled on each spindle means; drive-transmitting means coupled to the prime mover; hub-driving means coupled between each hub and said drive-transmitting means; and a multiple drive-wheel assembly mounted on each hub with the wheels symmetrically disposed on opposite sides of the axis of articulation of the adjacent knuckle joint.

3. In combination with a vehicle chassis having transversely spaced ground-engaging running gear means and having a prime mover directly mounted on said chassis, a drive axle and multiple drive-wheel assembly, comprising axle means disposed substantially along a transverse axis and spaced longitudinally of the chassis from said running gear means; differential means located between the ends of said axle means and coupled thereto; transmission means coupling said prime mover with said differential means to drive the axle means; trunnion means extending from the center of the axle means longitudinally of the chassis and journaled therein along a substantially horizontal axis about which the axle means can oscillate with respect to said chassis; a knuckle joint at each end of the axle means; spindle means coupled by the knuckle joint to each end of the axle means for articulation about a horizontal axis disposed longitudinally of the chassis and in the same plane as the axis of said trunnion means; a universal joint at each knuckle joint; shaft means coupling the opposite sides of the differential with one side of each universal joint; a hub journaled on each spindle means; hub-driving means coupling each hub to the other side of the adjacent universal joint; and a multiple-wheel assembly mounted on each hub with the wheels symmetrically disposed on opposite sides of the axis of articulation of the adjacent knuckle joint.

4. In combination with a vehicle chassis having transversely spaced ground-engaging wheels journaled substantially on a first transverse axis and having a prime mover directly mounted on said chassis, a drive axle and dual drive-wheel assembly, comprising axle means disposed substantially along a second transverse axis spaced longitudinally of the chassis from said first axis; differential means located between the ends of said axle means and coupled thereto; transmission means coupling said prime mover with said differential means to drive the axle means; trunnion means extending from the center of the axle means longitudinally of the chassis and journaled therein along a substantially horizontal axis about which the axle means can oscillate with respect to said chassis; a hollow knuckle joint at each end of the axle means; spindle means coupled by the knuckle joint to each end of the axle means for articulation about a horizontal axis disposed longitudinally of the chassis, the axes of the knuckle joints and the axis of the trunnion means all intersecting the axis of the axle means; a universal joint in each knuckle joint; shaft means coupling the opposite sides of the differential with one side of each universal joint; a hub journaled on each spindle means; hub-driving means coupling each hub to the other side of the adjacent universal joint; and a dual-wheel assembly mounted on each hub with the two wheels symmetrically disposed on opposite sides of the axis of articulation of the adjacent knuckle joint.

5. A drive axle and multiple-wheel assembly, comprising an axle housing having a differential housing intermediate its ends; a differential in said latter housing; power shaft means extending into said differential housing and coupled to drive the differential; trunnion means extending from the center of the axle housing on an axis perpendicular thereto and passing directly through the center of gravity of said axle and wheel assembly; a knuckle joint at each end of the axle housing; spindle means coupled by each knuckle joint to an end of the axle housing for articulation about an axis disposed parallel with the axis of said trunnion means and lying in a common plane therewith; hub means journaled on each spindle means; hub-driving means coupling each hub to said differential; and a multiple-wheel assembly mounted on each hub with at least two of the wheels disposed on opposite sides of the axis of articulation of the adjacent knuckle joint.

6. In an assembly as set forth in claim 5, limit means on the axle housing for limiting the angle of articulation of the wheel assembly about said axis of articulation.

7. A drive axle and dual-wheel assembly, comprising an axle housing having a differential housing intermediate its ends; a differential in said latter housing; power shaft means extending into said differential housing and coupled to drive the differential; trunnion means extending from the center of the axle housing on an axis perpendicular thereto and passing through the center of gravity of said axle and wheel assembly; a hollow knuckle joint at each end of the axle housing; spindle means coupled by each knuckle joint to an end of the axle housing for articulation about an axis disposed parallel with the axis of said trunnion means; a universal joint in each knuckle joint; shaft means in the axle housing and having its axis disposed normal to said above-mentioned axes and coupled to one side of each universal joint and to said differential; hub means journaled along its axis on each spindle means, the axes of the hub means and the axis of the trunnion means and the axes of the knuckle joints all intersecting the axis of said axle shaft means in a common plane; hub-driving means coupling each hub to the other side of the adjacent universal joint; and a dual wheel assembly mounted on each hub with the two wheels symmetrically disposed on opposite sides of the axis of articulation of the adjacent knuckle joint.

8. A drive axle assembly for mounting on a chassis, comprising an axle housing having a differential housing intermediate its ends; a differential in said latter housing; power shaft means extending into said differential housing and coupled to drive the differential; trunnion means extending from the center of the axle housing for mounting the latter on the chassis about a substantially horizontal axis of oscillation which passes through the center of gravity of said drive axle assembly; a hollow knuckle joint at each end of the axle housing; spindle means coupled by each knuckle joint to an end of the axle housing for articulation about an axis disposed parallel with and in the same plane as the axis of said trunnion means; a universal joint in each knuckle joint; shaft means in the axle housing and disposed normal to said above-mentioned axes and coupled to one side of each universal joint and to said differential; hub means journaled on each spindle means; and hub-driving means coupling each hub to the other side of the adjacent universal joint.

9. In combination, a vehicle chassis; plural transverse axles mutually spaced longitudinally of the chassis; ground-engaging running gear means carried on each axle; and controllable ground-working tool means supported by the chassis between longitudinally adjacent axles, at least one of said axles comprising an axle disposed transversely of said chassis; axle-mounting means on said chassis and on said axle and pivotally supporting the latter for oscillation with respect to the former about a substantially horizontal axis longitudinally disposed at the transverse center of the chassis and passing through the center of gravity of said one axle; spindle means at each end of the axle; a pivoted joint connecting each spindle means to an end of the axle about a horizontal axis of articulation disposed longitudinally of the chassis and in the same plane as the axis of the axle mounting means; and multiple wheels journaled on each spindle means with at least two of said wheels on each spindle means disposed on opposite sides of the axle of articulation of the adjacent pivotal joint.

10. In combination, a vehicle chassis; a prime mover on said chassis; steerable axle means disposed substantially transversely of said chassis; drive-axle means on said chassis longitudinally spaced from said steerable axle means; plural wheels on each axle means; controllable ground-working tool means supported by the chassis between said axle means; transmission means coupling the prime mover to drive the wheels on said drive-axle means, the drive-axle means comprising an axle disposed transversely of said chassis; axle-mounting means on said chassis and on said axle and pivotally supporting the latter for oscillation with respect to the former about a substantially horizontal axis longitudinally disposed at the transverse center of the chassis and passing through the center of gravity of said drive axle means; spindle means at each end of the axle; a pivoted joint connecting each spindle means to an end of the axle about a horizontal axis of articulation disposed longitudinally of the chassis and in the same plane as the axis of the axle mounting means; and multiple wheels journaled on each spindle means with at least two of said wheels on each spindle means disposed on opposite sides of the axis of articulation of the adjacent pivotal joint.

References Cited in the file of this patent

UNITED STATES PATENTS

| | | |
|---|---|---|
| 2,480,047 | Reinhard | Aug. 23, 1949 |
| 2,494,324 | Wright | Jan. 10, 1950 |
| 3,016,636 | Lado | Jan. 16, 1962 |

FOREIGN PATENTS

| | | |
|---|---|---|
| 324,741 | Great Britain | Feb. 6, 1930 |
| 465,493 | Great Britain | May 7, 1937 |
| 681,325 | Great Britain | Oct. 22, 1952 |